(12) United States Patent
Furusawa et al.

(10) Patent No.: US 10,857,644 B2
(45) Date of Patent: Dec. 8, 2020

(54) DUST COLLECTOR AND POWER TOOL

(71) Applicant: MAKITA CORPORATION, Anjo (JP)

(72) Inventors: Masanori Furusawa, Anjo (JP); Hideki Tsuji, Anjo (JP)

(73) Assignee: MAKITA CORPORATION, Anjo (JP)

( * ) Notice: Subject to any disclaimer, the term of this patent is extended or adjusted under 35 U.S.C. 154(b) by 118 days.

(21) Appl. No.: 16/220,436

(22) Filed: Dec. 14, 2018

(65) Prior Publication Data

US 2019/0193224 A1 Jun. 27, 2019

(30) Foreign Application Priority Data

Dec. 26, 2017 (JP) ................................ 2017-249811

(51) Int. Cl.
| | | |
|---|---|---|
| *B23Q 11/00* | (2006.01) | |
| *B25F 5/00* | (2006.01) | |
| *B23B 45/00* | (2006.01) | |
| *B25F 5/02* | (2006.01) | |

(52) U.S. Cl.
CPC ........ *B23Q 11/0071* (2013.01); *B23B 45/003* (2013.01); *B23Q 11/0046* (2013.01); *B25F 5/003* (2013.01); *B23B 2270/30* (2013.01); *B23B 2270/62* (2013.01); *B25F 5/029* (2013.01)

(58) Field of Classification Search
CPC .................. B23Q 11/0046; B23Q 11/0071
See application file for complete search history.

(56) References Cited

U.S. PATENT DOCUMENTS

| | | | | |
|---|---|---|---|---|
| 4,207,953 | A * | 6/1980 | Reibetanz | ............. B23B 49/006 |
| | | | | 173/21 |
| 9,114,491 | B2 * | 8/2015 | Kakiuchi | ........... B23Q 11/0046 |
| 2004/0208715 | A1 * | 10/2004 | Arich | ........................ B25F 5/02 |
| | | | | 408/67 |
| 2012/0234570 | A1 * | 9/2012 | Machida | ................... B25F 5/02 |
| | | | | 173/197 |
| 2012/0318553 | A1 * | 12/2012 | Chen | .................. B23Q 11/0046 |
| | | | | 173/198 |

(Continued)

FOREIGN PATENT DOCUMENTS

JP 2017-071022 A 4/2017

*Primary Examiner* — Andrew M Tecco
*Assistant Examiner* — Eyamindae C Jallow
(74) *Attorney, Agent, or Firm* — Oliff PLC

(57) ABSTRACT

A dust collector includes body, a dust-storing part, a sliding part, a dust-transfer passage, and a biasing member. The sliding part is held by the body to be slidable in a specified axial direction and has a suction port. The dust-transfer passage connects the suction port and the dust-storing part. The biasing member biases the sliding part in a first direction of the axial direction. The sliding part is configured to be normally held in an initial position in which the sliding part protrudes from the body by a specified length in the first direction, and to be moved in a second direction opposite to the first direction against the biasing force when pressed in the second direction. The dust collector includes a cushioning member configured to be interposed between the body and the sliding part in the axial direction when the sliding part is placed in the initial position.

16 Claims, 8 Drawing Sheets

(56) References Cited

U.S. PATENT DOCUMENTS

| | | | |
|---|---|---|---|
| 2013/0055523 A1* | 3/2013 | Yoshikane | B23Q 11/0046 15/347 |
| 2013/0183111 A1* | 7/2013 | Lerch | B23Q 11/0046 408/56 |
| 2016/0129540 A1* | 5/2016 | Tiede | B23Q 11/0046 173/197 |
| 2017/0100809 A1* | 4/2017 | Furusawa | B23Q 11/0071 |
| 2017/0173748 A1* | 6/2017 | Ullrich | B23Q 11/0071 |
| 2017/0203402 A1* | 7/2017 | Machida | B01D 46/0027 |
| 2017/0232565 A1* | 8/2017 | Machida | B23Q 11/0046 173/198 |
| 2017/0355053 A1* | 12/2017 | Furusawa | B23Q 11/0046 |

* cited by examiner

DUST COLLECTOR AND POWER TOOL

CROSS-REFERENCE TO RELATED APPLICATION

The present application claims priority to Japanese patent application No. 2017-249811 filed on Dec. 26, 2017, the contents of which are fully incorporated herein by reference.

TECHNICAL FIELD

The present disclosure relates to a dust collector that is configured to be removably mounted to a power tool, and the power tool having the dust collector.

BACKGROUND

A dust collector is known which can be mounted to a power tool such as a drill and a hammer drill and which is configured to collect dust generated during a drilling operation. For example, a dust collector which is disclosed in Japanese laid-open patent publication No. 2017-71022 may be mounted to a power tool via a sliding structure and an engagement member. The dust collector may suck dust together with air through a suction port, utilizing an air flow generated by a dust collecting fan of the power tool, and transfer the dust to a dust-storing part via a hose. In this dust collector, an elongate tubular member which holds the hose is held by a body so as to be slidable in a direction of its longitudinal axis.

SUMMARY

In the above-described dust collector, as a drilling operation proceeds and a tool accessory digs into a workpiece, the tubular member is pushed into the body while being held in abutment with the workpiece. When pressing of the tubular member is released upon completion of the drilling operation, the tubular member is pushed out to an initial position by a biasing force of the hose on which a coil spring is mounted. By impact at this time, the dust collector may be caused to move relative to the power tool, and may thus come off from the power tool.

Accordingly, it is an object of the present disclosure to provide technology that may help to improve stability of a mounting state of a dust collector with respect to a power tool.

According to one aspect of the present disclosure, a dust collector is provided which is configured to be mounted to a power tool, which is configured to perform a processing operation on a workpiece by driving a tool accessory. The dust collector is configured to collect dust generated during the processing operation. This dust collector includes a body, a dust-storing part, a sliding part, a dust-transfer passage and a biasing member.

The body has a mounting part which is configured to be removably mounted to the power tool. The dust-storing part is mounted to the body, and configured to store dust. The sliding part is held by the body so as to be slidable in a specified axial direction. Further, the sliding part has a suction part having a suction port for the dust. The dust-transfer passage connects the suction port and the dust-storing part. Further, at least a portion of the dust-transfer passage extends within the sliding part. The biasing member biases the sliding part in a first direction. The first direction is a direction of the specified axial direction in which the sliding part protrudes from the body. The sliding part is configured to be normally held in an initial position in which the sliding part protrudes from the body by a specified length in the first direction, by a biasing force of the biasing member. The sliding part is also configured to be moved in a second direction opposite to the first direction in the axial direction against the biasing force when the sliding part is pressed in the second direction. Further, the dust collector includes a cushioning member which is configured to be interposed between the body and the sliding part in the axial direction when the sliding part is placed in the initial position.

The dust collector of the present aspect may be mounted to the power tool and used with the suction part pressed against a workpiece while the processing operation is performed. The sliding part is moved in the second direction as the processing operation proceeds, and when pressing the suction part against the workpiece is released, the sliding part is biased in the first direction by the biasing member and returns to its initial position. Similarly, in a case where the sliding part is unintentionally pressed for any reason and moved in the second direction when not in use (for example, when carried), the sliding part returns to the initial position by the biasing force of the biasing member when the pressing is released. When the sliding part returns to the initial position, the cushioning member, which is interposed between the body and the sliding part in the axial direction, can absorb an impact force of the sliding part and thereby reduce impact on the body. Thus, a movement of the body relative to the power tool by the impact can be suppressed (reduced), so that stability of the mounting state of the body with respect to the power tool can be improved. Particularly, the risk can be reduced that the mounting part comes off from the power tool due to the movement of the body relative to the power tool.

In the present aspect, the power tool to which the dust collector may be removably mounted generally refers to a power tool which is capable of performing a processing operation which may cause dust to be generated. Typical examples of such power tools may include a drilling tool which is capable of drilling a workpiece. Specific examples of the drilling tool may include an electric drill, a vibration drill and a hammer drill. A dust collecting system of the dust collector of the present aspect is not particularly limited. The dust collector may be configured to have a motor and a fan and generate an air flow for sucking the dust, or the dust collector may be configured to collect the dust by utilizing an air flow generated by a motor and a fan of the power tool.

The structure of the mounting part which enables the mounting and removal of the dust collector to and from the power tool is not particularly limited. Preferable examples of such structures may include a combination of a guide rail and a guide groove which can be slidingly engaged with the guide rail, a combination of a projection (such as a hook) and a recess which can be engaged with the projection, and a combination of a columnar protrusion and a recess in which the protrusion can be fitted.

The structure of the dust-storing part is not particularly limited. For example, the dust-storing part may include a box-like container having an inlet for the air containing the dust and an outlet for the air from which the dust has been separated. The dust-storing part may be fixedly or removably mounted to the body.

The structure of the sliding part is not particularly limited, but it may be preferable that a portion of the sliding part which is held by the body so as to be slidable in the axial direction linearly extends in the axial direction. The sliding part may be surrounded by the body in a circumferential direction around its axis, or may be only partly held by the body. The dust-transfer passage may be defined in its entirety by a tubular member (such as a hose) which is different from the sliding part, or may be defined partly by a tubular portion of the sliding part and partly by a tubular member which is different from the sliding part. The biasing member may directly bias the sliding part in the first direction, or may indirectly bias the sliding part in the first direction via another member (such as a hose).

The structure of the cushioning member is not particularly limited, as long as the cushioning member is capable of absorbing an impact force by deforming. An elastic element, such as a spring, rubber and synthetic resin (plastic) having a foam structure, may be preferably employed as the cushioning member.

In one aspect of the present disclosure, the cushioning member may be mounted to the body. In the dust collector of the present aspect, the cushioning member is mounted not to the sliding part which may move in the axial direction, but to the body which holds the sliding part. With this structure, a space for disposing the cushioning member can be easily secured and flexibility of the arrangement position can be increased.

In one aspect of the present disclosure, the dust collector may further have an abutment member that is disposed adjacent to and on the second direction side of the cushioning member and that is configured to come into abutment with the sliding part when the sliding part is placed in the initial position. According to the present aspect, when the sliding part, which has been moved in the second direction, is biased in the first direction by the biasing member and returns to the initial position, the sliding part collides not with the cushioning member but with the abutment member. Therefore, the cushioning member can be prevented from being damaged by the impact of direct collision with the sliding part.

In one aspect of the present disclosure, the abutment member may be held to be slidable in the axial direction in a state in which a movement of the abutment member in the second direction is restricted.

In one aspect of the present disclosure, the sliding part may have an adjusting member whose locking position with respect to the sliding part is changeable in the axial position. The adjusting member may be configured to adjust the specified length by which the sliding part protrudes from the body in the initial position. The cushioning member may be configured to be interposed between the body and the adjusting member in the axial direction when the sliding part is placed in the initial position. In the dust collector of the preset aspect, the length by which the sliding part protrudes from the body in the initial position can be adjusted with the adjusting member, according to the length of the tool accessory to be actually coupled to the power tool. Further, the cushioning member can absorb the impact applied when the adjusting member returns to the initial position, so that the risk of damage to the adjusting member can be reduced.

In one aspect of the present disclosure, at least a portion of the sliding part may be formed of metal having a lower specific gravity than iron. The sliding part of the dust collector of the present aspect can enhance strength of the portion as necessary by using relatively lightweight metal in that portion. On the other hand, using the metal having the lower specific gravity than iron may increase the mass of the sliding part, compared with a case in which the whole sliding part is formed of plastic, so that its impact force may become larger. However, the cushioning member can effectively reduce the impact to be applied to the body when the sliding part returns to the initial position. Thus, strength can be secured as necessary, while maintaining the stable mounting state. It is noted that preferable examples of the metal having a lower specific gravity than iron may include aluminum, magnesium and an alloy containing at least one of aluminum and magnesium.

In one aspect of the present disclosure, the dust collector may further include a lock member which is held by the body so as to be pivotable around a specified pivot axis. The lock member may preferably have a hook which is configured to be engaged with a recess of the power tool to thereby restrict a movement of the dust collector relative to the power tool when the mounting part is mounted to the power tool. A distance between the pivot axis of the lock member and a tip end of the hook may preferably be shorter than a distance between the pivot axis and a base end of the hook. The movement of the dust collector of the present aspect relative to the power tool can be restricted by engagement between the hook of the lock member and the recess of the power tool when mounted to the power tool via the mounting part. The distance between the pivot axis of the lock member and the tip end of the hook being shorter than the distance between the pivot axis and the base end of the hook means that a radius of rotation of the tip end of the hook is shorter than a radius of rotation of the base end of the hook. With this structure, compared with a structure in which the distance between the pivot axis and the tip end of the hook is not less than the distance between the pivot axis and the base end of the hook, the hook can more easily interfere with the recess when pivoted, so that the hook and the recess may be less likely to be disengaged. Thus, the engagement between the hook and the recess can be more reliably maintained, so that the mounting state of the dust collector via the mounting part can be further stabilized.

In one aspect of the present disclosure, the dust collector may further include a lock member which is held by the body so as to be pivotable around a specified pivot axis. The lock member may preferably have a hook which is configured to be engaged with a recess of the power tool to thereby restrict a movement of the dust collector relative to the power tool when the mounting part is mounted to the power tool. The hook may have a sliding-resistance part which is provided in an inside region of the hook and configured to suppress (reduce) a sliding movement of the hook relative to the recess. According to the present aspect, the risk that the hook slides relative to the recess and becomes disengaged from the recess can further be reduced. It is noted that the sliding-resistance part may be formed, for example, by a friction material or an uneven surface structure.

In one aspect of the present disclosure, the body may have a first stopper part. The sliding part may have a second stopper part disposed to overlap with the first stopper part when viewed in the axial direction. The cushioning member may be interposed between the first stopper part and the second stopper part in the axial direction when the sliding part is placed in the initial position.

In one aspect of the present disclosure, the first stopper part, the cushioning member and the second stopper part may be disposed on a same line extending in the axial direction.

In one aspect of the present disclosure, the body may have a tubular part through which the sliding part is inserted and which holds the sliding part so as to be slidable in the axial direction. The first stopper part may be provided on an inner peripheral portion of the tubular part. The second stopper part may be provided on an outer peripheral portion of the sliding part.

In one aspect of the present disclosure, the first stopper part and the second stopper part may be configured as protruding parts which respectively protrude from an inner peripheral surface of the tubular part and an outer peripheral surface of the sliding part in a direction crossing a longitudinal axis of the sliding part.

In one aspect of the present disclosure, a power tool is provided which is configured to perform a processing operation on a workpiece by driving a tool accessory. This power tool includes a tool body and the dust collector which is removably mounted to the tool body via the mounting part. The dust collector defined in any one of the above-described aspects can be employed as the dust collector of the present aspect.

In one aspect of the present disclosure, the mounting part of the dust collector may include a guide rail or a guide groove which extends in the axial direction. The tool body of the power tool may have a guide groove configured to be slidingly engaged with the guide rail of the mounting part in the axial direction, or a guide rail configured to be slidingly engaged with the guide groove of the mounting part in the axial direction. According to the present aspect, the dust collector can be easily mounted and removed to and from the tool body of the power tool. On the other hand, since the sliding direction of the sliding part coincides with the mounting/removing direction of the dust collector, the impact which is applied when the sliding part returns to the initial position may act as a force in the direction of removing the dust collector. In the present aspect, however, the cushioning member can effectively reduce the impact on the body, which can effectively suppress (reduce) a relative sliding movement of the guide rails and the guide grooves, and thus, the movement of the dust collector in the direction of coming off from the tool body.

DETAILED DESCRIPTION OF THE EMBODIMENTS

An embodiment is now described with reference to the drawings. In the following embodiment, an electric hammer drill 1 is described as an example of a power tool which is configured to perform a processing operation by driving a tool accessory. Further, a dust collector 4 which is configured to be removably mounted to the hammer drill 1 is described.

Figure 1:
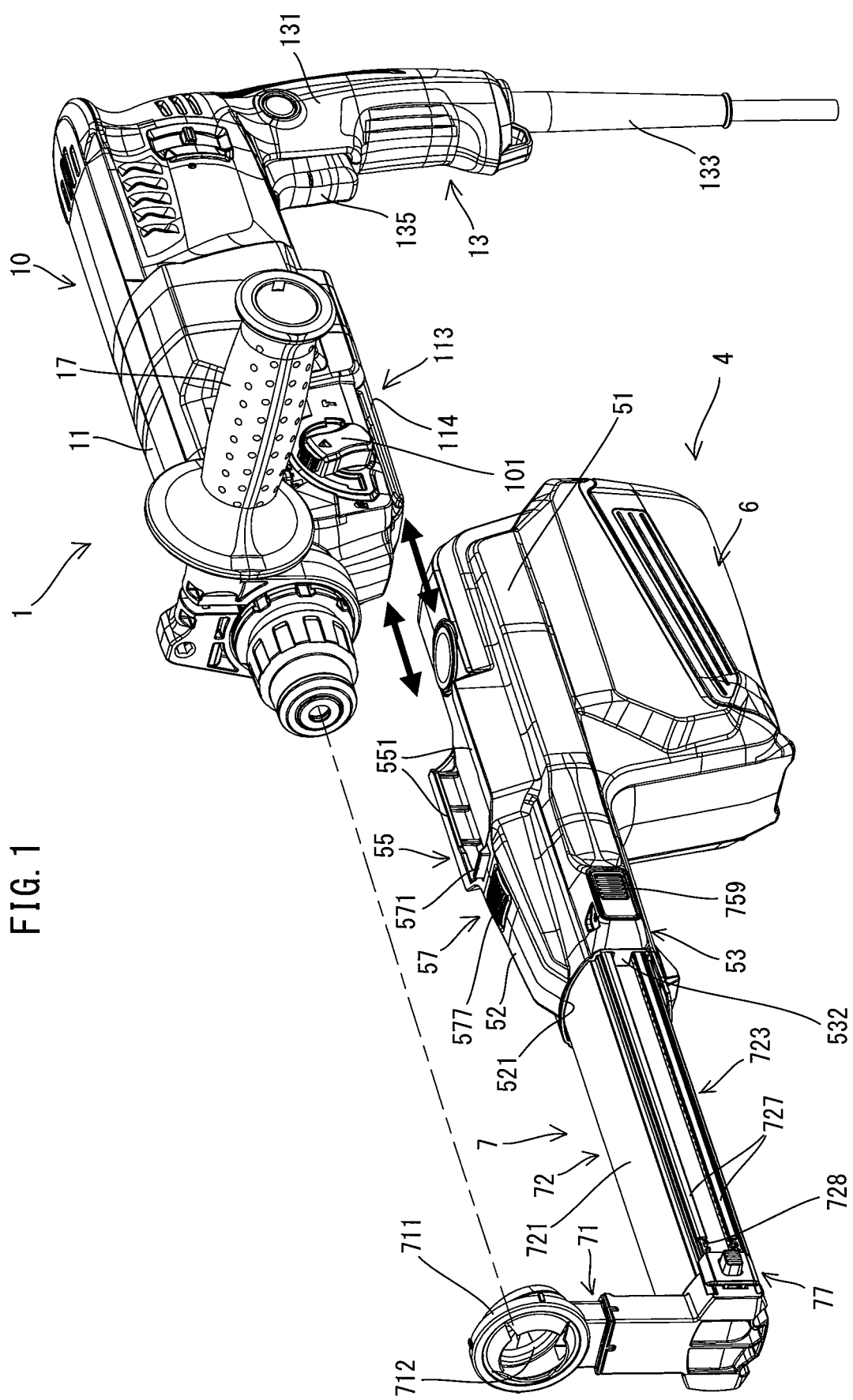
FIG. 1 is a perspective view for illustrating a manner of mounting and removing a dust collector to and from a hammer drill.
Figure 2:
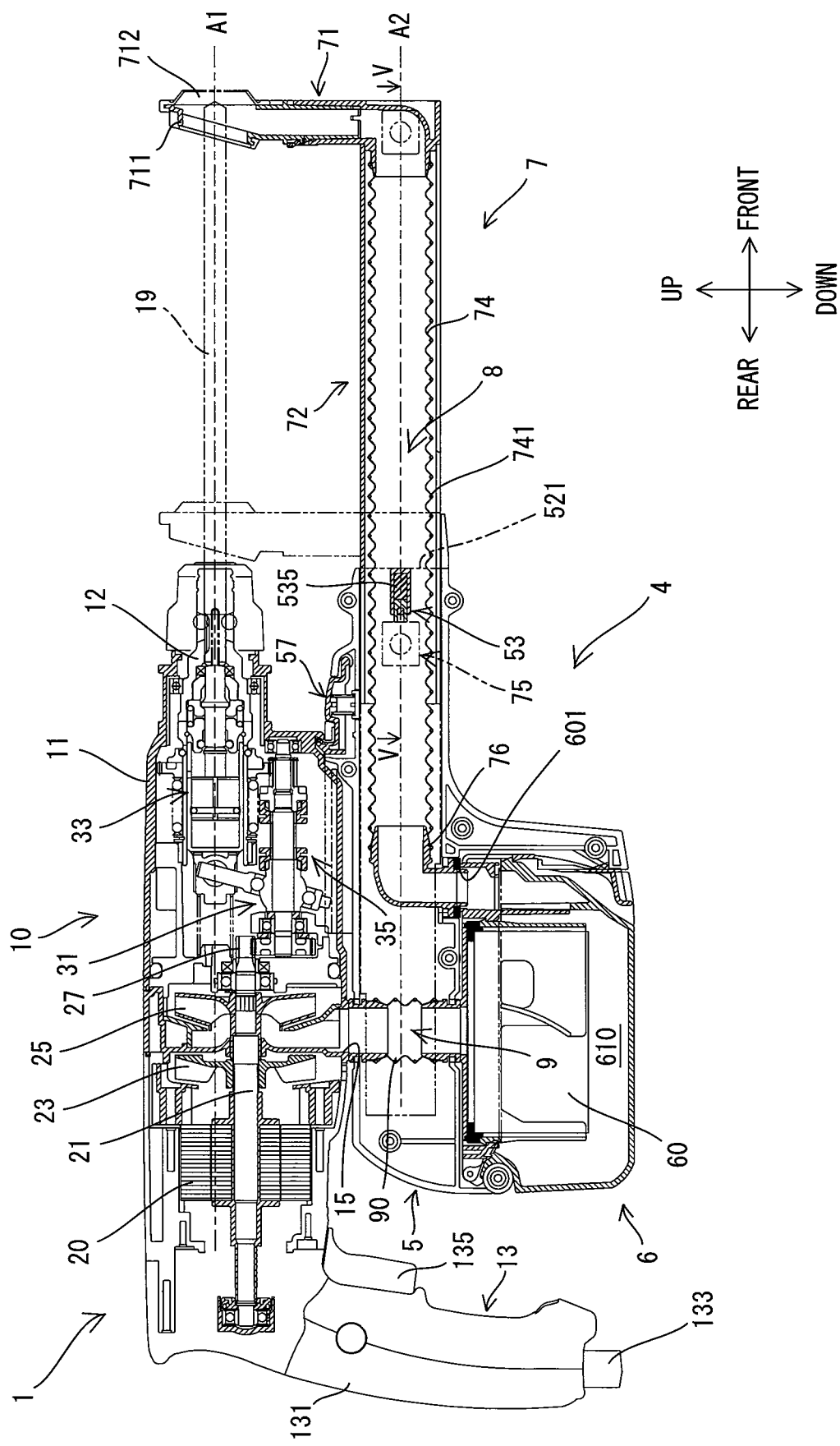
FIG. 2 is a sectional view in a front-rear direction of the hammer drill with the dust collector mounted thereto.

First, the overall structure of the hammer drill 1 is briefly described. As shown in FIGS. 1 and 2, the hammer drill 1 includes a body 10 and a handle 13. The body 10 has an elongate shape. A tool holder 12, to which a tool accessory 19 can be removably coupled, is provided in one end portion of the body 10 in a direction of a longitudinal axis (longitudinal axis direction) of the body 10. The handle 13 extends from the other end portion of the body 10 in the longitudinal axis direction, in a direction crossing (specifically, generally orthogonal to) the longitudinal axis direction. A plurality of tool accessories (such as a drill bit and a hammer bit) 19 which are different in kind and length corresponding to various processing operations are available for the tool holder 19. A user may select the tool accessory 19 of an appropriate kind and length according to an operation to be actually performed, and couple the tool accessory 19 to the hammer drill 1 for use.

The hammer drill 1 of the present embodiment is configured to perform an operation (a hammering operation) of linearly driving the tool accessory 19 along a specified drive axis A1, and an operation (a drilling operation) of rotationally driving the tool accessory 19 around the drive axis A1.

The structures of the body 10 and the handle 13 are described in detail below one by one. In the following description, for convenience sake, an extending direction of the drive axis A1 (in other words, the longitudinal axis direction of the body 10 or an axial direction of the tool accessory 19) is defined as a front-rear direction of the hammer drill 1. In the front-rear direction, the side on which the tool holder 12 is disposed is defined as a front side of the hammer drill 1, while the side to which the handle 13 is connected is defined as a rear side of the hammer drill 1. Further, a direction which is orthogonal to the drive axis A1 and which corresponds to an extending direction of the handle 13 is defined as an up-down direction. In the up-down direction, the side of the handle 13 which is connected to the body 10 is defined as an upper side, while a protruding end (free end) side of the handle 13 is defined as a lower side.

The body 10 is now described. As shown in FIGS. 1 and 2, the body 10 includes a body housing 11, the tool holder 12, a motor 20, a motion-converting mechanism 31, a striking mechanism 33 and a rotation-transmitting mechanism 35, of which structures are now described one by one.

The body housing 11 is a hollow body forming an outer shell of the body 10. As shown in FIG. 1, a front end portion of the body housing 11 forms a cylindrical barrel. A side handle 17 can be removably attached to an outer periphery of the barrel. A portion of the body housing 11 which extends rearward from the barrel has a generally rectangular box-like shape. As shown in FIG. 2, the tool holder 12 is disposed within the front end portion (the barrel) of the body housing 11. In addition, the motor 20, the motion-converting mechanism 31, the striking mechanism 33 and the rotation-transmitting mechanism 35 are housed within the body housing 11.

An inlet 15 is formed in a lower end wall of a central region of the body housing 11 in the front-rear direction. The inlet 15 is a through hole which provides communication between the inside and the outside of the body housing 11. The inlet 15 is provided to communicate with a communication passage 9 of the dust collector 4 when the dust collector 4 is attached to the hammer drill 1. An outlet (not shown) is also formed in the body housing 11 to discharge air which has flown in through the inlet 15 and passed through a specified air flow passage within the body housing 11.

Figure 3:
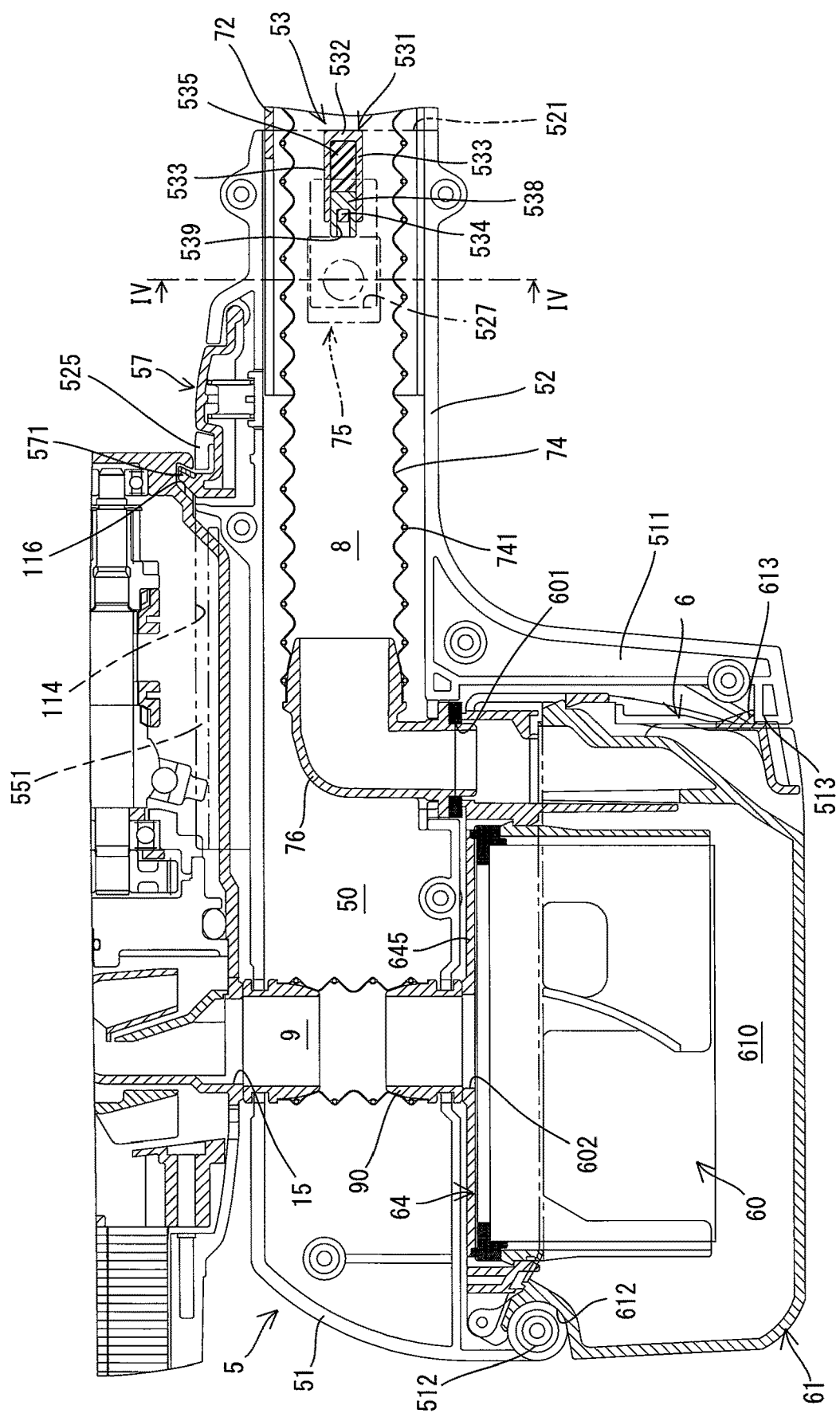
FIG. 3 is a partial, enlarged view of FIG. 2.

Further, as shown in FIG. 1, a mounting part 113 is provided in a lower end portion of the body housing 11. The mounting part 113 is configured such that the dust collector 4 can be removably mounted thereto. In the present embodiment, the mounting part 113 includes a pair of guide grooves 114 respectively formed in right and left side walls of the lower end portion of the body housing 11. The guide grooves 114 linearly extend in the front-rear direction from the front end to a central portion (to the front of the inlet 15) of the body housing 11. The pair of guide grooves 114 are configured to be engaged with a pair of guide rails 551 of the dust collector 4, which will be described later. Further, as shown in FIG. 3, an engagement recess 116 is formed in a lower front end portion (in front of the guide grooves 114) of the body housing 11. The engagement recess 116 is recessed upward from a lower end surface of the body housing 11. The engagement recess 116 is configured to be engaged with a hook 571 of a lock member 57 of the dust collector 4 when the dust collector 4 is placed at a specified position with respect to the body housing 11.

In the present embodiment, an alternate current (AC) motor is employed as the motor 20, which serves as a driving source for the tool accessory 19. As shown in FIG. 2, the motor 20 is disposed within a rear region of the body housing 11 such that a rotation axis of an output shaft 21 of the motor 20 extends in parallel to the drive axis A1 (that is, in the front-rear direction). A cooling fan 23 for cooling the motor 20 and a dust collecting fan 25 disposed in front of the cooling fan 23 are fixed to the output shaft 21. The dust collecting fan 25 is a suction fan configured to generate an air flow for sucking dust generated during the processing operation of the tool accessory 19. The dust collecting fan 25 is disposed above the above-described inlet 15. A driving gear 27 is provided on a front end portion of the output shaft 21. The cooling fan 23, the dust collecting fan 25 and the driving gear 27 rotate together with the output shaft 21.

The motion-converting mechanism 31, the striking mechanism 33 and the rotation-transmitting mechanism 35 are disposed within a front region of the body housing 11. Rotating power of the motor 20 may be transmitted to the motion-converting mechanism 31 and the rotation-transmitting mechanism 35 via the driving gear 27. The motion-converting mechanism 31 is configured to convert rotation of the output shaft 21 into reciprocating motion of a piston cylinder in a direction of the drive axis A1 by a swinging movement of a swinging ring. The striking mechanism 33 is configured to apply a striking force to the tool accessory 19 in the direction of the drive axis A1 when the piston cylinder reciprocates. The tool accessory 19 is linearly driven in the direction of drive axis A1 by the motion-converting mechanism 31 and the striking mechanism 33 when the motor 20 is driven. The rotation-transmitting mechanism 35 is configured as a speed reducing mechanism including a plurality of gears. The rotation-transmitting mechanism 35 is configured to transmit rotation of the motor 20 to the tool accessory 19 via the tool holder 12, which serves as a final output shaft. The tool accessory 19 is rotationally driven around the drive axis A1 at a lower speed than the output shaft 21 by the rotation-transmitting mechanism 35 when the motor 20 is driven. The structures of the motion-converting mechanism 31, the striking mechanism 33 and the rotation-transmitting mechanism 35 are well known and accordingly are not further elaborated here.

The hammer drill 1 of the present embodiment is configured such that any one of three modes, that is, a hammer drill mode, a drill mode and a hammer mode, can be selected by an operation of a mode change lever 101 (see FIG. 1) provided on the body 10. In the hammer drill mode, the motion-converting mechanism 31 and the rotation-transmitting mechanism 35 are driven, so that the hammering operation and the drilling operation are performed. In the hammer mode, power transmission in the rotation-transmitting mechanism 35 is interrupted and only the motion-converting mechanism 31 is driven, so that only the hammering operation is performed. In the drill mode, power transmission in the motion-converting mechanism 31 is interrupted and only the rotation-transmitting mechanism 35 is driven, so that only the drilling operation is performed. The structure of a mode switching mechanism is well known and accordingly is not described here. The dust collector 4 of the present embodiment may be particularly effective to be used when the hammer drill 1 is operated in the hammer drill mode or in the drill mode (that is, when a processing operation involving the drilling operation is performed).

The handle 13 is now described. As shown in FIGS. 1 and 2, the handle 13 is an elongate portion extending downward from a rear end portion of the body 10 and configured to be held by a user. The handle 13 includes a handle housing 131 which forms an outer shell of the handle 13, a power cable 133 and a trigger 135. The handle housing 131 may be formed separately from the body housing 11 and connected to the body housing 11, or may be integrally formed with at least a portion of the body housing 11.

The power cable 133 to be connected to an external AC power source extends from a lower end portion of the handle housing 131. The trigger 135 is provided on a front side of an upper end portion of the handle housing 131. A switch and a controller (which are not shown) are housed within the handle housing 131. The motor 20, the power cable 133 and the switch are electrically connected to the controller. When a user depresses the trigger 135, the switch is turned on and then the motor 20 is driven. The driving of the motor 20 is controlled by the controller.

The overall structure of the dust collector 4 is now briefly described. The dust collector 4 is normally used in a state in which it is mounted to the hammer drill 1. Therefore, in the following description, for convenience sake, directions of the dust collector 4 are defined to correspond to the directions of the hammer drill 1 with the dust collector 4 mounted thereto.

As shown in FIG. 2, the dust collector 4 includes a body 5, a dust-storing part 6, a sliding part 7, a dust-transfer passage 8 and a communication passage 9. The body 5 is configured to be removably mounted to a lower side of the body 10 of the hammer drill 1. The dust-storing part 6 is removably mounted to a lower side of the body 5. The sliding part 7 is generally L-shaped in a side view and has a suction port 712 for dust on its front end portion. The sliding part 7 is held by the body 5 so as to be slidable in the front-rear direction along a slide axis A2 which is parallel to the drive axis A1, in a state in which a portion of the sliding part 7 including the suction port 712 protrudes frontward from the body 5. At least a portion of the dust-transfer passage 8, through which the dust may be transferred, extends within the sliding part 7. The dust-transfer passage 8 connects the suction port 712 and the dust-storing part 6. Further, when the dust collector 4 is mounted to the hammer drill 1, the dust-storing part 6 is connected to the inlet 15 of the hammer drill 1 via the communication passage 9 disposed within the body 5.

When the motor 20 of the hammer drill 1 is driven, an air flow is generated by the dust collecting fan 25 which rotates together with the output shaft 21. The air flow flows in a direction to be sucked into the body housing 11 through the inlet 15. By this air flow, a suction force acts at the suction port 712, via the communication passage 9, the dust-storing part 6 and the dust-transfer passage 8 of the dust collector 4. The dust generated by the processing operation is sucked in through the suction port 712 together with the air by this suction force, and led into the dust-storing part 6 through the dust-transfer passage 8. In the dust-storing part 6, only the dust is separated from the air and stored. The air from which the dust has been separated flows through the communication passage 9, then into the body housing 11 of the hammer drill 1 from the inlet 15, and is discharged from the outlet (not shown). In this manner, the dust collector 4 is configured to collect the dust by utilizing the air flow generated by the dust collecting fan 25 of the hammer drill 1.

The structure of each part forming the dust collector 4 is now described in detail.

First, the structure of the body 5 is described. As shown in FIG. 2, the body 5 has an elongate shape corresponding to the body 10 of the hammer drill 1. The body 5 is configured to be removably mounted to the body 10. As shown in FIG. 3, in the present embodiment, the body 5 includes a box-like part 51 which forms a rear portion of the body 5 and a tubular part 52 which forms a front portion of the body 5. The box-like part 51 is a portion to which the dust-storing part 6 is removably mounted. The box-like part 51 has a generally rectangular box-like shape, and has a protruding part 511 protruding downward from its front end portion. The tubular part 52 is a portion which mainly serves to hold the sliding part 7 to be slidable in the front-rear direction, and has a generally rectangular tubular shape. The tubular part 52 extends in the front-rear direction along the slide axis A2. In the present embodiment, the body 5 is made of plastic and the box-like part 51 and the tubular part 52 are integrally formed with each other. The body 5 has an internal space 50 (a space region contiguously formed inside the box-like part 51 and the tubular part 52) extending in the front-rear direction along the slide axis A2. Further, the internal space 50 communicates with the outside of the body 5 via an opening 521 formed on a front end of the tubular part 52.

Figure 4:
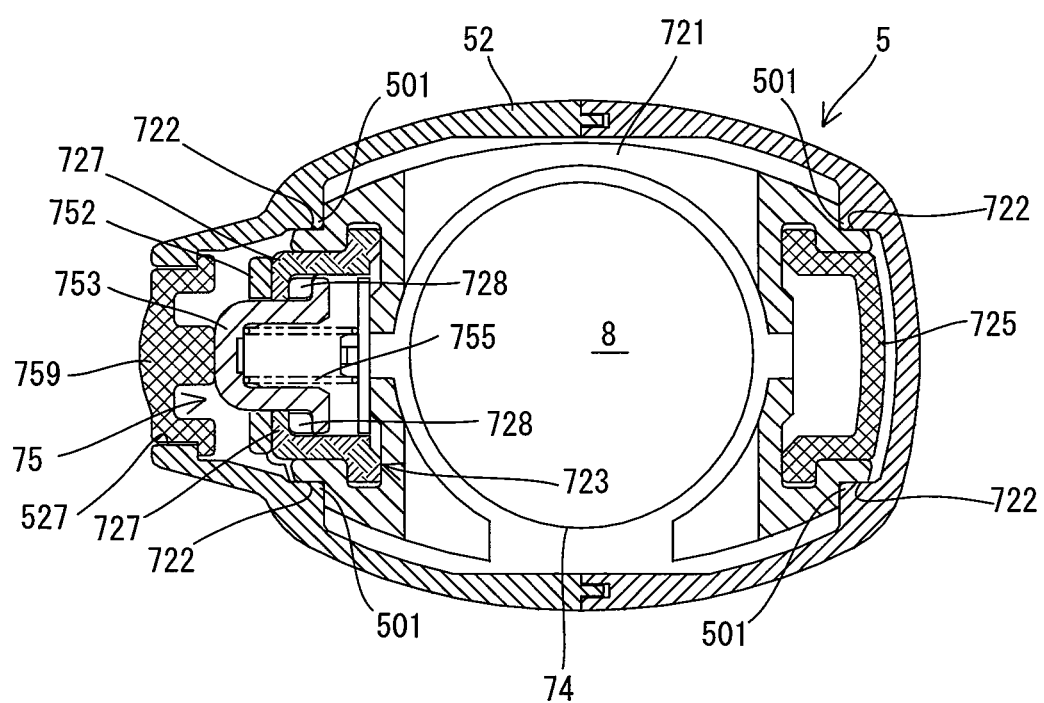
FIG. 4 is a sectional view taken along line IV-IV in FIG. 3.

A structure for holding the sliding part 7 to be slidable in the front-rear direction is provided within the body 5. Specifically, as shown in FIG. 4, on each of right and left inner wall surfaces of the body 5 are formed a pair of guide rails 501 spaced apart from each other in the up-down direction and extending in the front-rear direction. The guide rails 501 are protrusions protruding inward from each of the right and left inner wall surfaces of the body 5. The guide rails 501 are configured to be slidingly engaged with guide grooves 722 of the sliding part 7, which will be described later.

Figure 5:
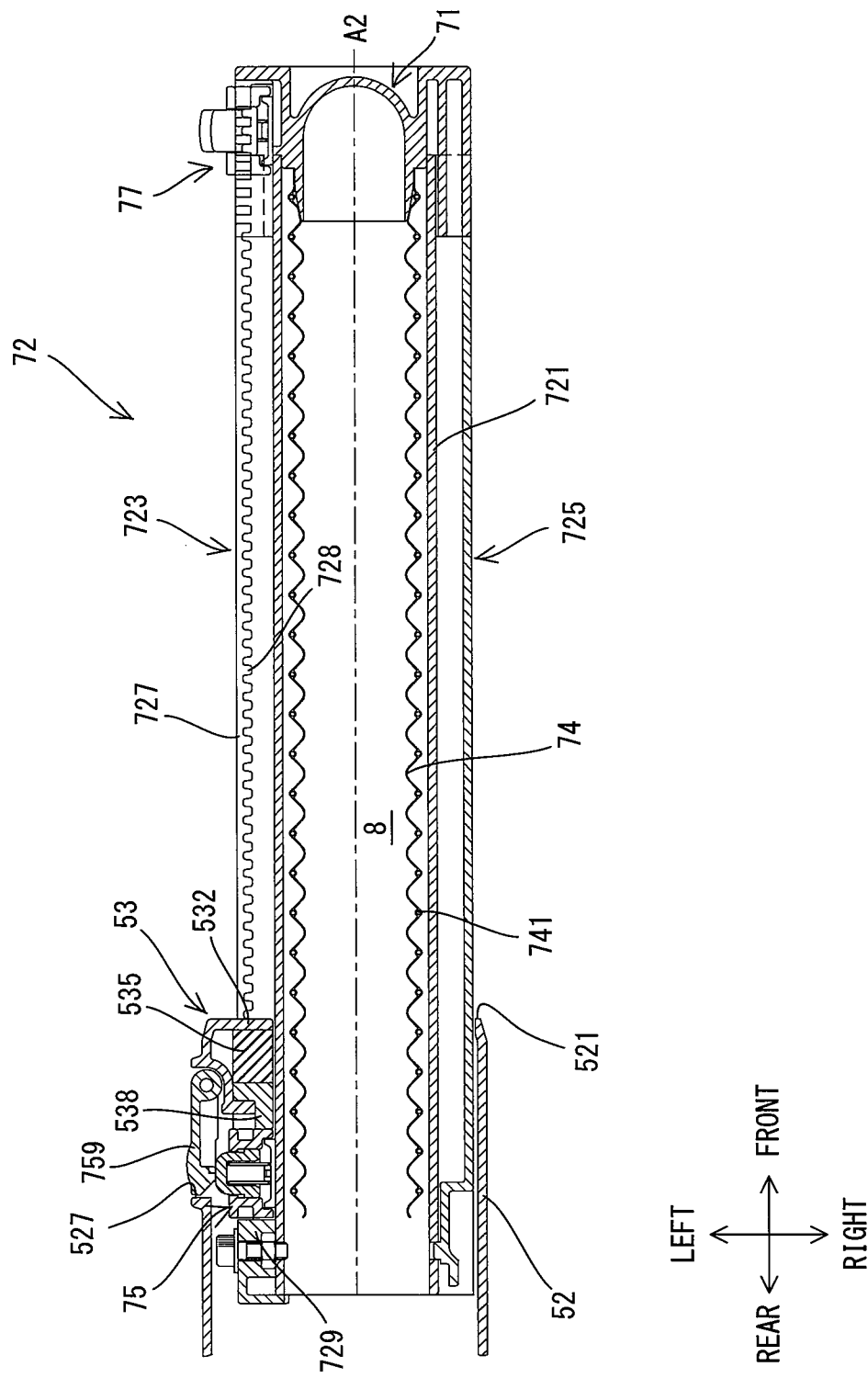
FIG. 5 is a sectional view taken along line V-V in FIG. 2.
Figure 6:
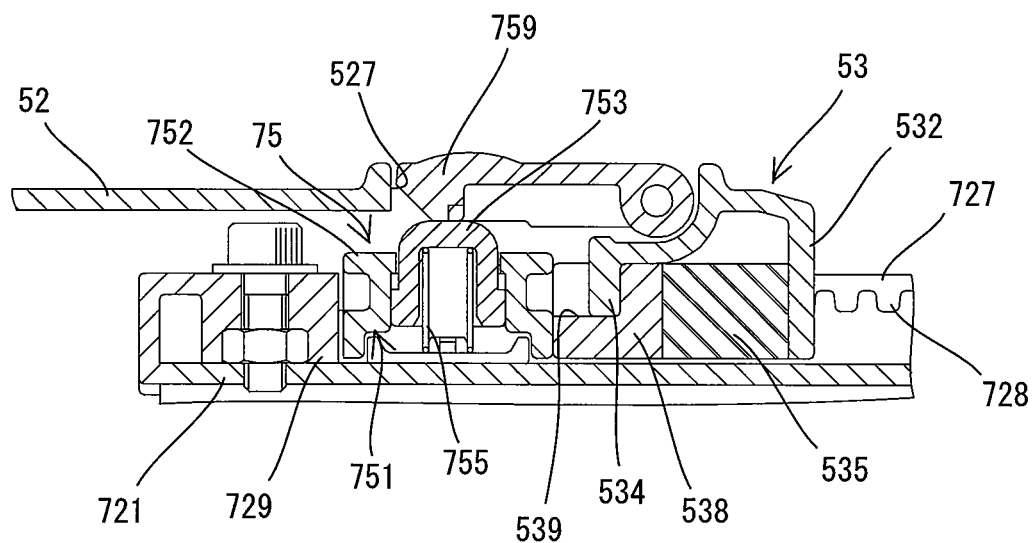
FIG. 6 is a partial, enlarged view of FIG. 5.

As shown in FIGS. 3, 5 and 6, a stopper part 53 is provided in a front end portion of the tubular part 52 in order to restrict a frontward movement of the sliding part 7 so that the sliding part 7 does not slip off from the body 5. In the present embodiment, the stopper part 53 is configured to reduce impact to be applied to the body 5 when the sliding part 7 returns to the initial position. The stopper part 53 includes a cushion-holding part 531, a cushion 535 and an abutment member 538. It is noted that the stopper part 53 is actually hidden behind a second tubular part 72 and unseen in the sectional view of FIG. 3, but its section is shown in FIG. 3 for convenience of explanation of its structure.

The cushion-holding part 531 is a wall part which protrudes inward (that is, rightward or toward the second tubular part 52) from an inner surface of a left side portion of the tubular part 52, and is configured to hold the cushion 53. More specifically, the cushion-holding part 531 includes a front wall 532 and a pair of upper and lower side walls 533.

A space surrounded from three sides by the front wall 532 and the side walls 533 forms a housing space for the cushion 535. Further, this housing space is secured by utilizing a dead space.

The cushion 535 is disposed between the front wall 532 and a positioning unit 75 (described later) in a direction of the slide axis A2 (in the front-rear direction). The cushion 535 is made of a cushioning material for reducing the impact to be applied to the body 5 when the sliding part 7 returns to the initial position. In the present embodiment, etherbased polyurethane sponge, which has excellent property in terms of restorability and durability, is employed as the cushion 535.

The abutment member 538 is disposed on a rear side of the cushion 535, adjacent to (in contact with) the cushion 535. The abutment member 538 is a member which comes into abutment with the positioning unit 75 when the sliding part 7 is placed in the initial position. In the present embodiment, the abutment member 538 is formed of synthetic resin (plastic) in a rectangular block-like shape as a whole. The abutment member 538 has a groove 539 extending linearly from one end to a central portion of the abutment member 538. The abutment member 538 is fitted in between the side walls 533 so as to be slidable in the front-rear direction. A projection 534 is formed to protrude inward (rightward) from the inner surface of the left side portion of the tubular part 52 and disposed between rear end portions of the side walls 533. The abutment member 538 is disposed such that the projection 534 is engaged with the groove 539. With this structure, the abutment member 538 is prevented from moving further rearward. On the other hand, when the abutment member 538 is pressed forward, the abutment member 538 is allowed to slightly move forward, due to deformation of the cushion 535.

A rectangular opening 527 is formed in the left side portion of the tubular part 52 so as to face a rear end portion of the abutment member 538 and a specified region at the rear of the abutment member 538. Further, an operation lever 759 for the positioning unit 75 is disposed to cover the opening 527. The operation lever 759 is held at its front end portion by the tubular part 52 via a pin so as to be pivotable in a left-right direction.

Further, as shown in FIG. 1, an engagement part 55 is formed on an upper end portion of the body 5 (specifically, the box-like part 51). The engagement part 55 is configured to be removably mounted to the body 10 (specifically, to the mounting part 113) of the hammer drill 1. In the present embodiment, the engagement part 55 is configured as a pair of protruding portions which protrude upward from right and left end portions of the body 5 and extend in the front-rear direction. The engagement part 55 has a length which corresponds to the length of the guide grooves 114 of the mounting part 113 in the front-rear direction. Further, the engagement part 55 has a pair of guide rails 551 on its upper end portions The pair of guide rails 55 protrude inward (toward each other). The guide rails 551 are configured to be slidingly engaged in the front-rear direction with the guide grooves 114 of the mounting part 113. With this structure, in the present embodiment, a direction (shown by thick arrows) of mounting/removing the dust collector 4 to/from the hammer drill 1 (the body housing 11) is set to the front-rear direction, which is parallel to the drive axis A1 and the slide axis A2 of the hammer drill 1.

The lock member 57 is provided in front of the engagement part 55 of the body 5. The lock member 57 is disposed to be rotated in the up-down direction in response to an external operation of a user. The lock member 57 is configured to be engaged with the engagement recess 116 of the hammer drill 1 to thereby restrict the movement of the dust collector 4 relative to the hammer drill 1, once the dust collector 4 is mounted to the hammer drill 1.

Figure 7:
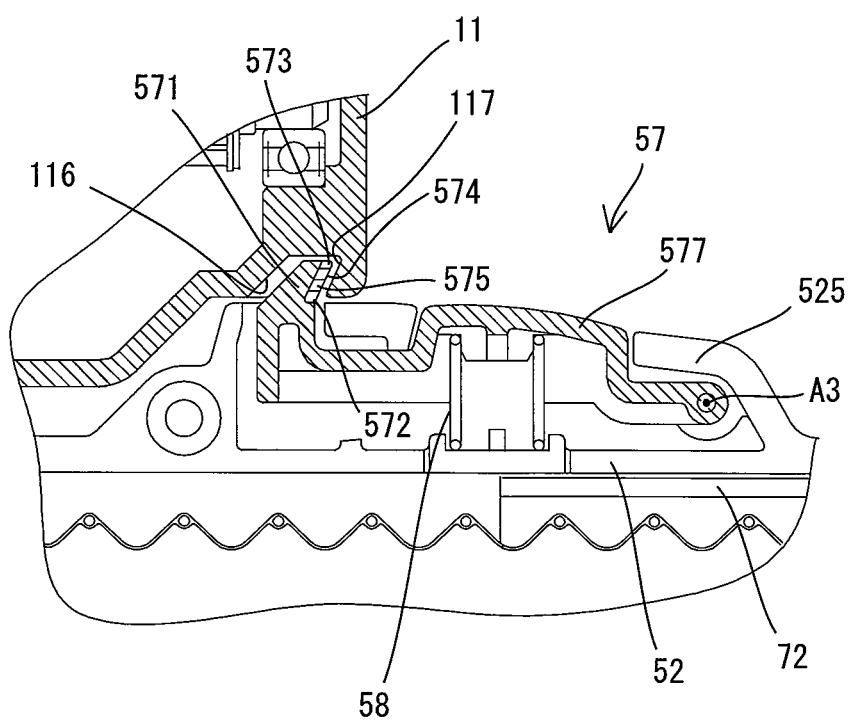
FIG. 7 is a partial, enlarged view of FIG. 2, illustrating a state that a hook is engaged with an engagement recess.

As shown in FIG. 7, the lock member 57 is disposed within a housing part 525 formed on an upper side of the tubular part 52. A front end portion of the lock member 57 is locked within a front end portion of the housing part 525, so that the lock member 57 is pivotable around a pivot axis A3 extending in the left-right direction. Further, the lock member 57 has a hook 571 and a pressing part 577 which are respectively provided in a rear end portion and a central portion of the lock member 57. The hook 571 is a portion which is engageable with the engagement recess 116 of the hammer drill 1. The pressing part 577 is a portion to be pressed from the outside by a user. A biasing spring 58 is disposed between the lock member 57 and an upper surface of the tubular part 52. The biasing spring 58 is configured as a compression coil spring. The lock member 57 is always biased upward by the biasing spring 58, and the hook 571 and the pressing part 577 are respectively exposed upward through two openings formed in a top surface of the housing part 525. This exposed position of the hook 571 is referred to as an initial position of the hook 571. With such a structure, the lock member 57 is held by the housing part 525 so as to be pivotable in the up-down direction, around its front end portion.

Figure 8:
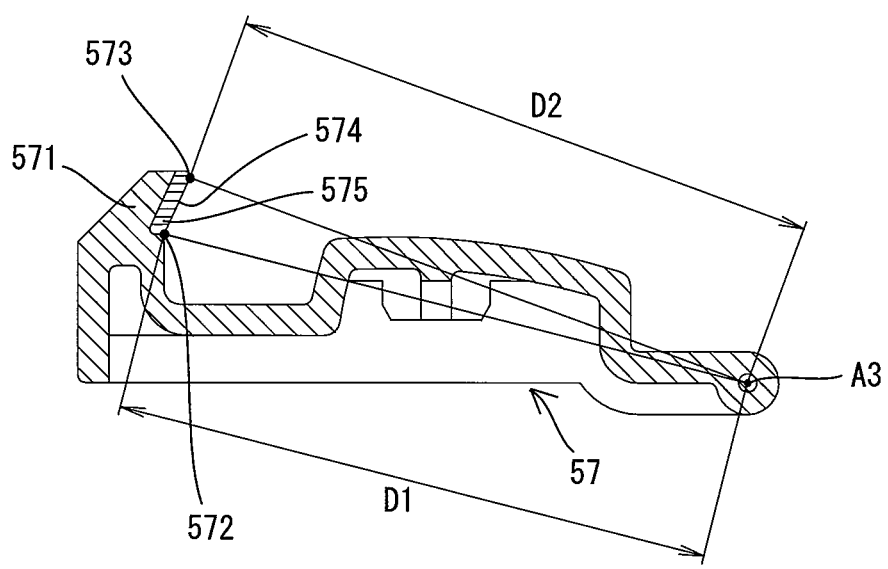
FIG. 8 illustrates the hook.

The structure of the hook 571 is now described in detail. As shown in FIG. 8, in the initial position, the hook 571 protrudes obliquely upward and forward. In the following description, one end (lower end) of the hook 571 from which the hook 571 protrudes obliquely upward and forward is referred to as a base end 572, and the other end or protruding end of the hook 571 is referred to as a tip end 573. In the present embodiment, both the base end 572 and the tip end 573 are generally parallel to the pivot axis A3, and a front surface 574 (a surface on the pivot axis A3 side) of the hook 571 is a rectangular flat surface. In the present embodiment, the front surface 574 is formed of an elastomer layer 575, while the remaining portion of the lock member 57 is formed of synthetic resin (plastic). In the present embodiment, the elastomer layer 575 is integrally molded with the other portion of the lock member 57. However, the elastomer layer 575 may be bonded with an adhesive or otherwise joined to the other portion of the lock member 57 which has been formed of synthetic resin in advance.

Further, in the present embodiment, the hook 571 is configured such that a distance D2 between the pivot axis A3 and the tip end 573 is shorter than a distance D1 between the pivot axis A3 and the base end 572. The distances D1 and D2 correspond to radii of rotation of the base end 572 and the tip end 573, respectively. In other words, a circular-arc track of the tip end 573 around the pivot axis A3 is located inward of (that is, closer to the pivot axis A3 than) a circular-arc track of the base end 572 around the pivot axis A3. With such a structure, the front surface 574 of the present embodiment is inclined inward (that is, toward the pivot axis A3) by about 10 degrees with respect to an imaginary front surface 574 of an imaginary hook 571 which is configured such that the distance D1 is equal to the distance D2.

As shown in FIG. 7, the above-described engagement recess 116, to which the hook 571 is engageable, has a shape which corresponds to the hook 571. An opposed surface 117 of the engagement recess 116 which is configured to be opposed to the front surface 574 (the elastomer layer 575) of the hook 571 is generally parallel to the front surface 574 when the dust collector 4 is mounted to the hammer drill 1 and the hook 571 is located in the initial position.

Further, the body 5 is provided with a structure for holding the dust-storing part 6. Specifically, as shown in FIG. 3, a circular columnar rotation-support part 512 is provided in a lower rear end portion of the box-like part 51 and extends in the left-right direction. Further, a locking part 513 protruding rearward is provided in a lower end portion of the protruding part 511 and extends in the left-right direction. A rotation-engagement part 612 and a locking protrusion 613 of the dust-storing part 6, which will be described later, are respectively engaged with the rotation-support part 512 and the locking part 513, so that the dust-storing part 6 is mounted to the body 5.

The structure of the dust-storing part 6 is now described. As shown in FIG. 3, the dust-storing part 6 has a generally rectangular box-like shape as a whole and is removably mounted to the lower side of the body 5. In the present embodiment, the dust-storing part 6 has a container body 61, a filter holder 64 and a filter 60.

The container body 61 is formed as a hollow body having a rectangular box-like shape with an open top. The internal space of the container body 61 forms a storing space 610 for storing dust. Further, the rotation-engagement part 612 and the locking protrusion 613 are respectively formed in an upper rear end portion and a lower front end portion of the container body 61. The rotation-engagement part 612 is formed as a recess having a semicircular section corresponding to the rotation-support part 512 of the body 5. The rotation-engagement part 612 is configured to be engaged with the rotation-support part 512 so as to be rotatable around the rotation-support part 512. The locking protrusion 613 is formed as a protrusion protruding forward and configured to be locked to an upper end of the locking part 513. when mounting the dust-storing part 6 to the body 5 (the box-like part 51), a user engages the rotation-engagement part 612 with the rotation-support part 512, with the front end portion of the dust-storing part 6 tilted downward and then pushes up the front end portion to lock the locking protrusion 613 to the locking part 513.

The filter holder 64 is configured to hold the filter 60 and to cover the open top of the container body 61. The filter 60 is mounted in a folded state to the filter holder 64 and held within the storing space 610. The filter 60 is formed of an air permeable material such as paper and nonwoven fabric and configured to separate dust from air when the air led into the storing space 610 passes through the filter 60. An inlet 601 and an outlet 602 which provide communication between the dust-storing part 6 (the storing space 610 of the container body 61) and the outside are formed in a top face part 645 of the filter holder 64. The inlet 601 is an opening through which the air sucked in from the suction port 712 (see FIG. 2) with the dust and transferred through the dust-transfer passage 8 flows into the dust-storing part 6. The outlet 602 is an opening through which the air from which the dust has been separated by the filter 60 flows out of the dust-storing part 6. The inlet 601 is provided in a front end portion of the top face part 645. A hose connecting part 76, which will be described later, is connected to the inlet 601. The outlet 602 is provided in a central portion of the top face part 645. A connection tube 90 is connected to the outlet 602.

The structure of the communication passage 9 is now described. As shown in FIG. 3, the communication passage 9 is disposed in the internal space 50 of the body 5. The communication passage 9 is configured to connect the outlet 602 of the dust-storing part 6 and the inlet 15 of the hammer drill 1 when the dust collector 4 is mounted to the hammer drill 1. In the present embodiment, the communication passage 9 is disposed in a rear region of the internal space 50 (in a central region inside the box-like part 51) and extends in the up-down direction. In the present embodiment, the communication passage 9 is defined by the connection tube 90. The connection tube 90 is formed as a tubular member which is deformable in an axial direction (the up-down direction) as a whole. Upper and lower end portions of the connection tube 90 which are formed of an elastic material are respectively fitted in through holes formed in upper and lower walls of the body 5 (the box-like part 51), so that the connection tube 90 is held by the body 5. Both of flanges formed on upper and lower ends of the connection tube 90 slightly protrude to the outside of the body 5.

The lower end flange of the connection tube 90 is closely pressed against the periphery of the outlet 602 of the dust-storing part 6 (the filter holder 64) from above. Further, when the dust collector 4 is mounted to the body housing 11 of the hammer drill 1, the upper end flange of the connection tube 90 is closely pressed against the periphery of the inlet 15 of the body housing 11 from below. Thus, the outlet 602 and the inlet 15 are connected to each other via the connection tube 90.

The structure of the sliding part 7 is now described. As shown in FIGS. 1 and 2, the sliding part 7 includes a first tubular part 71 and a second tubular part 72. The first tubular part 71 has the suction port 712. The second tubular part 72 is connected to the first tubular part 71 and held by the body 5.

The first tubular part 71 is a tubular member which is generally L-shaped in a side view. A suction hood 711 is provided on one end portion of the first tubular part 71. The suction hood 711 is configured to cover a tip end portion of the tool accessory 19. The suction port 712 extends through the suction hood 711 in the front-rear direction. The one end portion having the suction hood 711 and the opposite end portion of the first tubular part 71 are hereinafter referred to as a front end portion and a base end portion, respectively.

The second tubular part 72 has a generally tubular shape as a whole, although an opening extending in the front-rear direction is formed in its lower end portion, and the second tubular part 72 linearly extends. The second tubular part 72 is disposed to extend in the front-rear direction along the slide axis A2, in parallel to the drive axis A1. The base end portion of the first tubular part 71 is connected and fixed to a front end portion of the second tubular part 72, while the front end portion of the first tubular part 71 is faced upward. A portion of the second tubular part 72 including its rear end portion is always placed within the internal space 50 through the opening 521.

As shown in FIGS. 1 and 4, in the present embodiment, an outer shell of the second tubular part 72 is mainly formed by a body frame 721 made of aluminum, and a left side part 723 and a right side part 725 which are made of plastic. The body frame 721 is a linearly extending elongate member. Both the left side part 723 and the right side part 725 are linearly extending elongate members and are fitted in grooves formed in left and right side portions of the body frame 721, respectively. The second tubular part 72 is configured to be slidingly engaged with the body 5. Specifically, as shown in FIG. 4, in each of the left and right side portions of the body frame 721 are formed a pair of guide grooves 722 spaced apart from each other in the up-down direction and extending in the front-rear direction. The guide grooves 722 are respectively configured to be slidingly engaged with the guide rails 501 formed in the inner wall surface of the body 5. With this structure, the sliding part 7 is held to be slidable in the front-rear direction (in a longitudinal axis direction of the second tubular part 72) along the slide axis A2 while the second tubular part 72 is prevented from moving around the slide axis A2 relative to the body 5.

As shown in FIGS. 4 and 5, the positioning unit 75 is provided on the second tubular part 72. The positioning unit 75 is configured to define the initial position of the sliding part 7 relative to the body 5 (in other words, to define the protruding length of the sliding part 7 from the body 5 (the opening 521)) in the front-rear direction. The positioning unit 75 is configured to be movable relative to the second tubular part 72 in the direction of the slide axis A2 (in the front-rear direction), and to be locked to the second tubular part 72 at a desired position in the direction of the slide axis A2 (in the front-rear direction). More specifically, the positioning unit 75 is held by a pair of guide rails 727 on the second tubular part 72 so as to be movable relative to the second tubular part 72 in the direction of the slide axis A2 (in the front-rear direction) and lockable to the guide rails 727. As shown in FIG. 1, the guide rails 727 are provided on the left side part 723. The guide rails 727 are spaced apart from each other in the up-down direction and extends in the front-rear direction, generally in parallel to each other. Each of the guide rails 727 has a teeth 728 including a plurality of projections arranged at equal intervals in one row in the front-rear direction.

As shown in FIGS. 4 and 6, in the present embodiment, the positioning unit 75 mainly includes a stopper 751, a locking member 753 and a biasing spring 755. A left side face part 752 of the stopper 751 has a rectangular shape in a side view, and is disposed on the left side of the upper and lower guide rails 727 so as to extend over between the guide rails 727, and the remaining portion of the stopper 751 is disposed inward (that is, on the slide axis A2 side, or on the right side) of the guide rails 727. The stopper 751 has a through hole in its central portion, and the locking member 753 is inserted through the through hole. Although not shown in detail, the locking member 753 has recesses, which can be engaged with the teeth 728 of the guide rails 727, respectively. The locking member 753 is normally biased in a direction to protrude to the outside (to the left side) through the through hole of the stopper 751 and one of the projections of the teeth 728 is held in engagement with the recess of the locking member 753. Thus, the positioning unit 75 is positioned and locked with respect to the second tubular part 72 in the front-rear direction. A method of defining the initial position of the sliding part 7 by the positioning unit 75 will be described later.

The dust-transfer passage 8 is now described. As shown in FIG. 2, the dust-transfer passage 8 connects the suction port 712 and the inlet 601 of the dust-storing part 6, and at least a portion of the dust-transfer passage 8 extends within the sliding part 7. Dust sucked in from the suction port 712 is transferred to the dust-storing part 6 through the dust-transfer passage 8. In the present embodiment, the dust-transfer passage 8 is defined by the above-described first tubular part 71, a hose 74 and the hose connecting part 76.

One end portion of the hose 74 is connected to the base end portion of the first tubular part 71, which is inserted into the front end portion of the second tubular part 72. The hose 74 is formed in a bellows shape to be extensible. The other end portion of the hose 74 is connected to one end portion of the hose connecting part 76. The hose connecting part 76 is a tubular member bent in an L-shape as viewed from the side. The one end portion of the hose connecting part 76 faces forward and is connected to the hose 74. The other end portion of the hose connecting part 76 is fitted in a through hole formed in the lower wall of the body 5 and protrudes downward. The lower end portion of the hose connecting part 76 is inserted into the container body 61 through the inlet 601. Thus, the dust-transfer passage 8 which extends through the first tubular part 71, the hose 74 and the hose connecting part 76 communicates with the housing space 610 of the dust-storing part 6. Further, a biasing spring 741, which is configured as a compression coil spring, is fitted on the hose 74.

In the dust collector 4 having the above-described structure, the sliding part 7 is normally held in the initial position while being biased forward, that is, in the direction to protrude from the body 5 (the opening 521), by the elastic force of the biasing spring 741. As shown in FIGS. 5 and 6, the initial position of the sliding part 7 in the present embodiment is a position in which the positioning unit 75 (specifically, the stopper 751) is in abutment with a rear end of the stopper 53 (specifically, the abutment member 538) of the body 5 and thus the sliding part 7 is prevented from further moving forward. When the positioning unit 75 is placed in this position, the operation lever 759 provided on the front end portion of the tubular part 52 of the body 5 faces the positioning unit 75 through the opening 527. More specifically, a tip end (free end) portion of the operation lever 759 faces the locking member 753 protruding leftward from the through hole of the stopper 751.

Mounting and removing the dust collector 4 (the body 5) to and from the hammer drill 1 (the body housing 11) is now described. As shown in FIG. 1, when a user wants to mount the dust collector 4 to the hammer drill 1, the user slidingly engages the guide rails 551 with the guide grooves 114 of the mounting part 113 and moves the dust collector 4 rearward relative to the hammer drill 1. In the process of the rearward movement of the dust collector 4, the hook 571 is once pressed down by a front end portion of the body housing 11 against the biasing force of the biasing spring 58. Thereafter, when the dust collector 4 is moved to a specified position, as shown in FIG. 7, the hook 571 is biased by the biasing spring 58 and engaged with the engagement recess 116. Thus, mounting of the dust collector 4 to the hammer drill 1 is completed. The hook 571 can then restrict a movement of the body 5 relative to the body housing 11 by engaging with the engagement recess 116, and thereby keep engagement between the guide grooves 114 and the guide rails 551.

Figure 9:
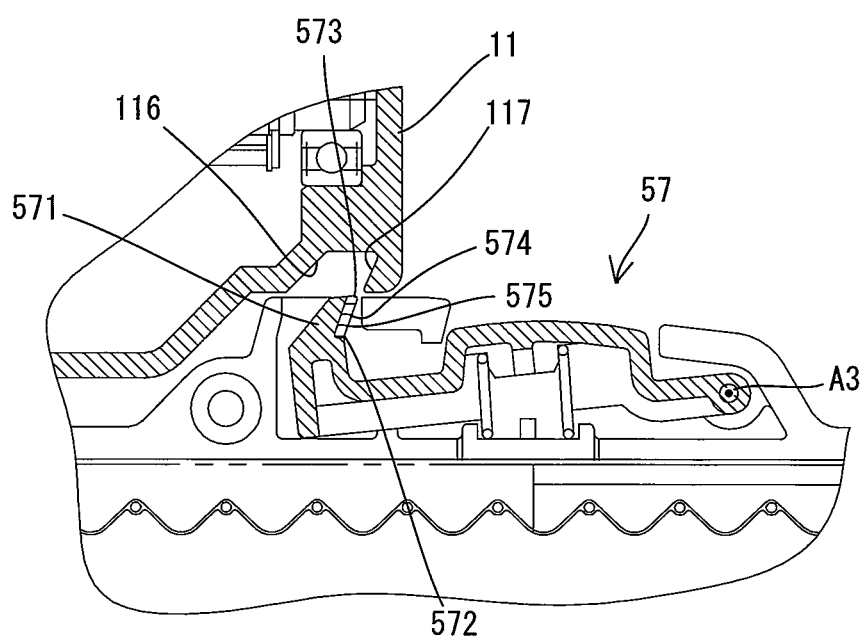
FIG. 9 illustrates a state that the hook and the engagement recess are disengaged.

When the user wants to remove the dust collector 4 from the hammer drill 1, as shown in FIG. 9, the user presses the pressing part 577 downward, so that the locking member 57 is pivoted downward against the biasing force of the biasing spring 58 and the hook 571 is disengaged from the engagement recess 116. In this state, the user can detach the dust collector 4 from the hammer drill 1 by moving the dust collector 4 forward relative to the hammer drill 1. As described above, the locking member 57 is configured to be switched between the state of keeping the engagement between the guide grooves 114 and the guide rails 551 and the state of allowing disengagement therebetween.

A method of changing the initial position (the protruding length of the sliding part 7) is described now. As described above, the tool accessories 19 having different lengths are available for use with the hammer drill 1. Therefore, a user can change a locking position (see FIGS. 4 to 6) of the positioning unit 75 with respect to the guide rails 727, according to the length of the tool accessory 19 to be actually used. First, when the user presses the operation lever 759 rightward (toward the inside of the tubular part 52), the tip end portion of the operation lever 759 presses the locking member 753 rightward against the biasing force of the biasing spring 755, so that the locking member 753 is disengaged from the teeth 728. Then, while pressing the operation lever 759 with one hand, the user moves the sliding part 7 in the front-rear direction relative to the body 5 with the other hand, so as to adjust the protruding length of the sliding part 7 such that the tip end portion of the tool accessory 19 is covered by the suction hood 711 (see FIG. 2). In the meantime, the positioning unit 75 is held between the operation lever 759 and the body frame 721 in a state in which the positioning unit 75 is disengaged (unlocked) from the guide rails 727. Therefore, the sliding part 7 moves in the front-rear direction relative to the positioning unit 75 as well. Thereafter, the user can engage the locking member 753 at another position on the teeth 728 by releasing the operation of pressing the locking member 753 via the operation lever 759.

A user can change the locking position of the positioning unit 75 in the direction of the slide axis A2 (in the front-rear direction) by the above-described method. Accordingly, the initial position of the sliding part 7 relative to the body 5, that is, the protruding length of the sliding part 7 from the body 5 (the opening 521) can also be changed. FIG. 5 shows a state in which the positioning unit 75 is placed on a rearmost end of the second tubular part 72. In this state, the protruding length of the sliding part 7 is maximum. Further, a stopper part 729 is provided on the rear end portion of the second tubular part 72. The stopper part 729 is configured to prevent the positioning unit 75 from further moving rearward by abutment with the positioning unit 75.

Figure 10:
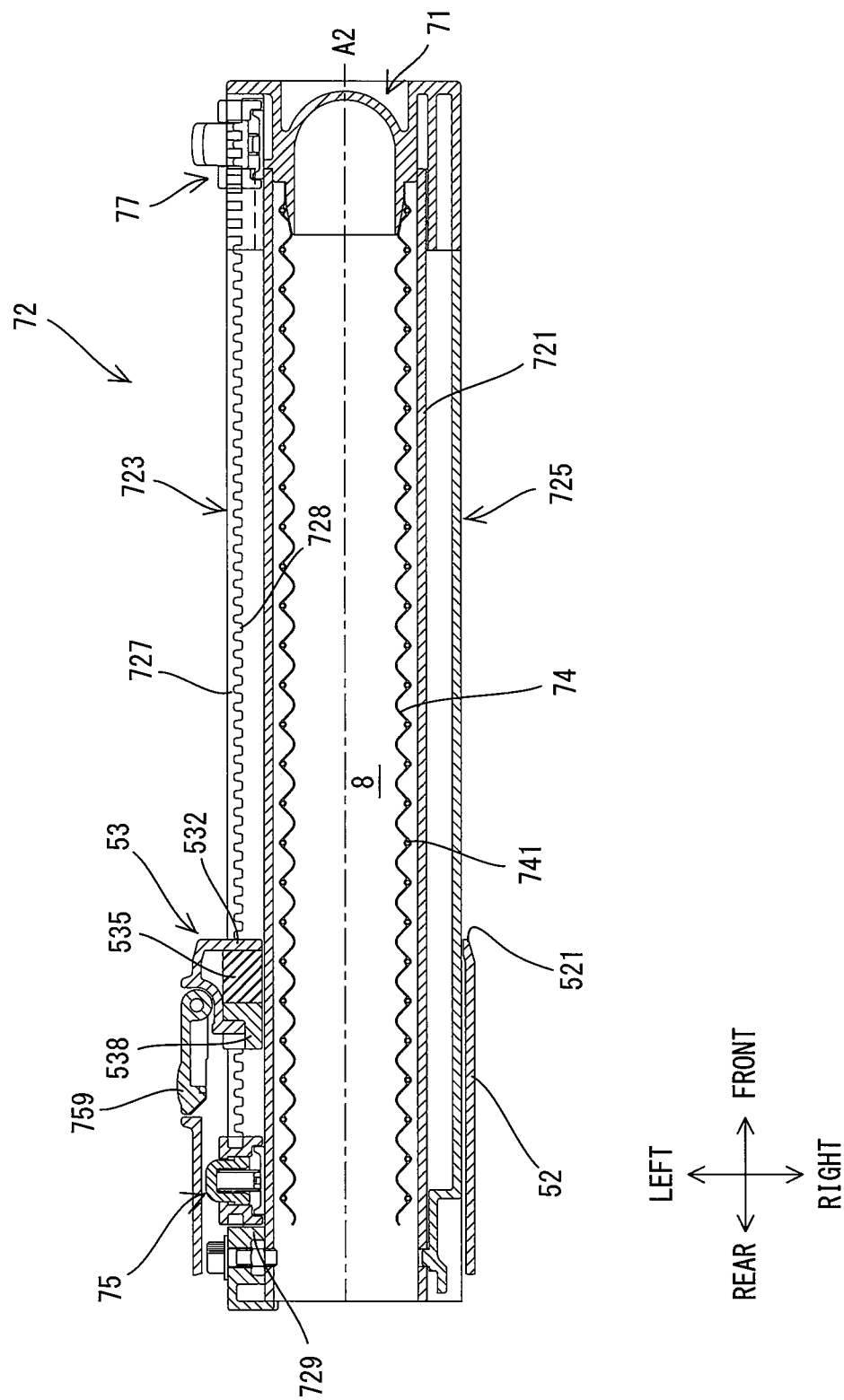
FIG. 10 illustrates a state that a sliding part is pushed in rearward from the position shown in FIG. 5.

Operations of the hammer drill 1 and the dust collector 4 are now described. When the trigger 135 is depressed by a user in a state in which the dust collector 4 is mounted to the hammer drill 1, the motor 2 is driven. Then, as described above, a processing operation by the tool accessory 19 is performed while dust is sucked together with air from the suction port 712. When the processing operation (typically, a drilling operation) proceeds with the suction hood 711 pressed against the workpiece, the sliding part 7 is pushed into the body 5 (the internal space 50) against the biasing force of the biasing spring 741. As shown in FIG. 10, the positioning unit 75 moves rearward relative to the body 5 together with the sliding part 7 while being locked to the guide rails 727. Specifically, the positioning unit 75 is gradually moved away from the abutment member 538 of the stopper part 53.

In the present embodiment, a depth adjusting unit 77 having generally the same structure as the positioning unit 75 is provided on the second tubular part 72. Like the positioning unit 75, the depth adjusting unit 77 is held by the guide rails 727 so as to be movable in the direction of the slide axis A2 (in the front-rear direction), and can be locked to the guide rails 727. When the depth adjusting unit 77 comes into abutment with the front end (the opening 521) of the body 5 (the tubular part 52), the sliding part 7 is prevented from further moving rearward relative to the body 5. Specifically, the processing depth of the workpiece (in the case of the drilling operation, the depth of a hole to be drilled) corresponds to the distance between the opening 521 and a rear end of the depth adjusting unit 77. Therefore, the user can set the processing depth to a desired depth by changing the locking position of the depth adjusting unit 77 on the guide rails 727 in the same procedure as that for changing the locking position of the positioning unit 75.

When the processing is completed to the desired depth, the user releases the trigger 135 to stop the motor 2 and releases the suction hood 711 from the workpiece. In response to the releasing, the sliding part 7 is pushed out frontward toward the initial position by the hose 74 having the biasing spring 741, and the stopper 751 of the positioning unit 75 collides with the abutment member 538 of the stopper part 53 (see FIG. 5). In the present embodiment, however, as described above, the cushion 535 formed of polyurethane sponge is interposed between the front wall 532 and the abutment member 538 of the stopper part 53 in the direction of the slide axis A2 (in the front-rear direction). When an impact force is applied to the cushion 535 via the abutment member 538 which is slid forward by collision with the stopper 751, the cushion 535 can absorb the impact force and effectively reduce impact on the body 5. Thus, a movement of the body 5 relative to the body housing 11 due to the impact can be suppressed (reduced), so that stability of the mounting state of the body 5 with respect to the body housing 11 can be enhanced.

In the present embodiment, the body frame 721 which forms a portion of the sliding part 7 is formed of aluminum for strength. Therefore, compared with a case in which the whole sliding part 7 is formed of plastic, the mass of the sliding part 7 is greater, so that the impact force of collision of the stopper 751 with the abutment member 538 is likely to be larger. In the present embodiment, however, the cushion 535 can effectively reduce this impact on the body 5. Thus, the strength of the body frame 721 can be secured as necessary, while maintaining a stable mounting state of the dust collector 4.

Further, in the present embodiment, the dust collector 4 can be easily mounted and removed to and from the hammer drill 1 by slidingly engaging and disengaging the guide rails 551 with and from the guide grooves 114 in the front-rear direction. On the other hand, since the sliding direction of the sliding part 7 coincides with the mounting/removing direction of the dust collector 4, the impact which is applied when the sliding part 7 returns to the initial position may act as a force in the direction of removing the dust collector 4 from the hammer drill 1. In the present embodiment, however, the cushion 535 can effectively reduce the impact on the body 5, which can suppress (reduce) the relative sliding movement of the guide rails 551 and the guide grooves 114, and thus, can suppress (reduce) the movement of the dust collector 4 in the direction of coming off from the hammer drill 1.

In the present embodiment, the body 5 is provided with the lock member 57 which is configured to restrict the movement of the dust collector 4 relative to the hammer drill 1, while the guide rails 551 are engaged with the guide grooves 114. The hook 571 of the lock member 57 is configured such that the distance D2 between the pivot axis A3 and the tip end 573 is shorter than the distance D1 between the pivot axis A3 and the base end 572. In other words, the radius of rotation of the tip end 573 is shorter than the radius of rotation of the base end 572. With this structure, compared with a structure in which the distance D2 between the pivot axis A3 and the tip end 573 is not less than the distance D1 between the pivot axis A3 and the base end 572, the hook 571 can easily interfere with the engagement recess 116 when pivoted, so that the hook 571 and the engagement recess 116 may be less likely to be disengaged. Thus, the engagement between the hook 571 and the engagement recess 116 can be more reliably maintained, so that the mounting state of the dust collector 4 via the guide grooves 114 and the guide rails 551 can be further stabilized.

Particularly, in the present embodiment, the front surface 574 of the hook 571 is formed by the elastomer layer 575. The friction force of the elastomer layer 575 can effectively suppress (reduce) a relative sliding movement of the hook 571 and the engagement recess 116 (the opposed surface 117) of the body housing 11 which is made of synthetic resin. Therefore, the hook 571 and the engagement recess 116 are less likely to be disengaged.

In the present embodiment, when the sliding part 7 returns to the initial position while the hammer drill 1 is oriented such that the suction hood 711 faces downward and the slide axis A2 vertically extends, the abutment member 538 may be subjected to a particularly large impact load, due to a load of the hose 74 having the biasing spring 741 and a load of the free-falling sliding part 7 including the aluminum body frame 721. If the hook 571 becomes disengaged in such a state, the guide rails 551 may slide downward along the guide grooves 114 and therefore cause the dust collector 4 to slip off from the hammer drill 1. In the present embodiment, however, the cushion 535 can effectively reduce the impact on the body 5 and thereby suppress the pivotal movement of the hook 571. Further, the hook 571 has a structure which makes it harder to be disengaged from the engagement recess 116. These structures can make the dust collector 4 less likely to come off from the hammer drill 1.

In the present embodiment, the stopper 751 of the sliding part 7 collides not with the cushion 535 but with the abutment member 538. Therefore, the cushion 535 can be prevented from being damaged by impact of a direct collision with the stopper 751. Further, although the stopper 751 collides with the abutment member 538, the cushion 535 can absorb the impact force of the collision, so that the risk of damage to the stopper 751 and the positioning unit 75 can also be reduced.

In the above description of the operation is exemplified a case in which the sliding part 7 is pushed rearward from the initial position during the processing operation and returns to the initial position after completion of the processing operation. In other cases (for example, in a case in which the sliding part 7 is hit by something and pushed rearward when the hammer drill 1 is carried with the dust collector 4 mounted thereto), the cushion 535 can also effectively reduce impact to be applied to the body 5 when the sliding part 7 returns to the initial position, which can make it harder for the dust collector 4 to come off from the hammer drill 1.

Correspondences between the features of the above-described embodiment and its modifications and the features of the invention are as follows. The hammer drill 1 is an example that corresponds to the "power tool". The dust collector 4 is an example that corresponds to the "dust collector". The body 5 is an example that corresponds to the "body". The engagement part 55 is an example that corresponds to the "mounting part". The dust-storing part 6 is an example that corresponds to the "dust-storing part". The sliding part 7 is an example that corresponds to the "sliding part". The suction hood 711 and the suction port 712 are examples that correspond to the "suction part" and the "suction port", respectively. The slide axis A2 is an example that corresponds to the "specified axis". The dust-transfer passage 8 is an example that corresponds to the "dust-transfer passage". The biasing spring 741 is an example that corresponds to the "biasing member". The cushion 535 is an example that corresponds to the "cushioning member". The abutment member 538 is an example that corresponds to the "abutment member". The positioning unit 75 is an example that corresponds to the "adjusting member". The lock member 57 is an example that corresponds to the "lock member". The pivot axis A3 is an example that corresponds to the "pivot axis". The hook 571 and the engagement recess 116 are examples that correspond to the "hook" and the "recess", respectively. The elastomer layer 575 is an example that corresponds to the "sliding resistance part". The body housing 11 is an example that corresponds to the "tool body". The guide rail 551 is an example that corresponds to the "guide rail" of the "mounting part". The guide groove 114 is an example that corresponds to the "guide groove" of the "tool body".

The above-described embodiment is a mere example, and the dust collector and the power tool according to the present invention are not limited to the structures of the dust collector 4 and the hammer drill 1 of the above-described embodiment, respectively. For example, the following modifications may be made. Further, one or more of these modifications may be employed in combination with the dust collector 4 and the hammer drill 1 of the above-described embodiment, or with the claimed invention.

The dust collector 4 may be applied to a power tool other than the hammer drill 1. For example, the dust collector 4 can be suitably applied to a drilling tool (such as a vibration drill and an electric drill) which is capable of performing only a drilling operation and not capable of performing a hammering operation.

In the above-described embodiment, the dust collector 4 is configured to collect dust by an air flow which is generated by the motor 20 and the dust collecting fan 25 of the hammer drill 1. However, the dust collector 4 itself may have a motor and a dust collecting fan to generate an air flow for sucking dust. In this case, the communication passage 9 is not required. Furthermore, in order to supply current to the motor in the dust collector 4, for example, a connector which is electrically connectable to the hammer drill 1 may be provided. According to such a modification, or regardless of such a modification, the structures of the body 5, the dust-storing part 6, the sliding part 7 and the dust-transfer passage 8 and the arrangement relations therebetween may be appropriately changed.

For example, in the above-described embodiment, the sliding part 7 is biased forward by the hose 74 having the biasing spring 741. Alternatively, the sliding part 7 may be biased by a spring (such as a compression coil spring, a spiral spring and a flat (leaf) spring) which is provided separately from the hose 74. In the above-described embodiment, the dust-transfer passage 8 is defined by the first tubular part 71, the hose 74 and the hose connecting part 76. The dust-transfer passage 8 may, however, be defined, for example, only by a hose which connects the suction port 712 and the dust-storing part 6, since the dust-transfer passage 8 only needs to be configured such that dust can be transferred together with air from the suction port 712 to the dust-storing part 6 therethrough. The dust-storing part 6 does not need to be removable from the body 5, but it may be integrally formed with the body 5.

The structure for mounting the dust collector 4 to the hammer drill 1 or another power tool is not limited to the combination of the guide rails 551 and the guide grooves 114 of the above-described embodiment. A different engagement structure, such as a combination of a projection (such as a hook) and a recess which can be engaged with the projection, or a combination of a columnar protrusion and a recess in which the protrusion can be fitted, may be employed instead. Further, contrary to the above-described embodiment, such guide rails may be provided on the hammer drill 1 and such guide grooves may be provided on the dust collector 4.

It may be preferable that a structure like the lock member 57 is provided, in addition to the above-described engagement structure, in order to restrict the movement of the dust collector 4 relative to the hammer drill 1 and maintain the engagement state by the engagement structure. However, such a structure can be omitted. Further, the structure of the lock member 57 may also be appropriately changed or modified. For example, the lock member 57 may be a protrusion which is configured to be linearly moved in the up-down direction and fitted in a recess provided in the lower end portion of the body housing 11. Further, the structure for suppressing or reducing the sliding movement of the hook 571 relative to the engagement recess 116 (the opposed surface 117) (that is, the structure which provides the hook 571 with sliding resistance) may be other than the elastomer layer 575. For example, a structure which is configured to increase the friction coefficient of contact surfaces of the hook 571 and the engagement recess 116 may be provided on at least one of an inside region of the hook 571 and an inner surface of the engagement recess 116, to which the hook is to be locked. For example, at least one of the inside region of the hook 571 and the inner surface of the engagement recess 116 may be made uneven or have irregularities, or a friction material such as sandpaper may be bonded thereto.

The structure for reducing impact to be applied to the body 5 when the sliding part 7 returns to the initial position is not limited to the cushion 535. For example, a coil spring, rubber or synthetic resin foam other than polyurethane sponge may also be employed. Such a cushioning structure may be interposed between a portion of the body 5 and a portion of the sliding part 7 in the direction of slide axis A2 (in the front-rear direction) so as to absorb the impact force applied when the sliding part 7 returns to the initial position. The cushioning structure may be held by a different portion of the body 5, or the cushioning structure may be mounted not to the body 5 but to the sliding part 7. For example, the cushioning structure may be provided on a front end of the positioning unit 75 (the stopper 751). It may be preferable that the portion of the body 5 and the portion of the sliding unit 7 are disposed to overlap with each other when seen in the direction of the slide axis A2, as in the case of the front wall 532 and the positioning unit 75 (the stopper 751) of the above-described embodiment. It may be further preferable that the portion of the body 5, the portion of the sliding unit 7, and the cushioning structure are disposed on the same line which is parallel to the slide axis A2. Further, a plurality of such cushioning structures may be provided.

In view of the nature of the present invention and the above-described embodiment, the following structures (features) are provided. One or more of the structures (features) can be employed in combination with the hammer drill 1 of the embodiment and its modifications, or in combination with the claimed invention.

(Aspect 1)

The body may have a first stopper part, the sliding part may have a second stopper part disposed to overlap with the first stopper part when viewed in the axial direction, and the cushioning member may be interposed between the first stopper part and the second stopper part in the axial direction when the sliding part is placed in the initial position.

The front wall 532 of the above-described embodiment is an example that corresponds to the "first stopper part" according to the present aspect. The positioning unit 75 (the stopper 751) is an example that corresponds to the "second stopper part" according to the present aspect.

(Aspect 2)

In Aspect 1, the first stopper part, the cushioning member and the second stopper part may be disposed on a same line extending in the axial direction.

(Aspect 3)

In Aspect 1 or 2, the body may have a tubular part through which the sliding part is inserted and which holds the sliding part so as to be slidable in the axial direction, the first stopper part may be provided on an inner peripheral portion of the tubular part, and the second stopper part may be provided on an outer peripheral portion of the sliding part.

(Aspect 4)

In Aspect 3, the first stopper part and the second stopper part may be configured as protruding parts which respectively protrude from an inner peripheral surface of the tubular part and an outer peripheral surface of the sliding part in a direction crossing a longitudinal axis of the sliding part.

(Aspect 5)

The abutment member may be held to be slidable in the axial direction in a state in which a movement of the abutment member in the second direction is restricted.

(Aspect 6)

The tool body may further include:

a recess to which the hook is to be locked, and a sliding resistance part provided on an inner surface of the recess to which the hook is to be locked, and configured to suppress a sliding movement of the hook relative to the recess.

DESCRIPTION OF THE NUMERALS

1: hammer drill, 10: body, 101: mode change lever 101, 11: body housing, 113: mounting part, 114: guide groove, 116: engagement recess, 117: opposed surface, 12: tool holder, 13: handle, 131: handle housing, 133: power cable, 135: trigger, 15: inlet, 17: side handle, 19: tool accessory, 20: motor, 21: output shaft, 23: cooling fan, 25: dust collecting fan, 27: driving gear, 31: motion-converting mechanism, 33: striking mechanism, 35: rotation-transmitting mechanism, 4: dust collector, 5: body, 50: internal space, 501: guide rail, 51: box-like part, 511: protruding part, 512: rotation support part, 513: locking part, 52: tubular part, 521: opening, 525: storing part, 527: opening, 53: stopper part, 531: cushion holding part, 532: front wall, 533: side wall, 534: projection, 535: cushion, 538: abutment member, 539: groove, 55: engagement part, 551: guide rail, 57: lock member, 571: hook, 572: base end, 573: tip end, 574: front surface, 575: elastomer layer, 577: pressing part, 58: biasing spring, 6: dust-storing part, 60: filter, 601: inlet, 602: outlet, 61: container body, 610: storing space, 612: rotation engagement part, 613: locking protrusion, 64: filter holder, 645: top surface, 7: sliding part, 71: first tubular part, 711: suction hood, 712: suction port, 72: second tubular part, 721: body frame, 722: guide groove, 723: left side part, 725: right side part, 727: guide rail, 728: teeth, 729: stopper part, 74: hose, 741: biasing spring, 75: positioning unit, 751: stopper, 752: left side surface part, 753: locking member, 755: biasing spring, 759: operation lever, 76: hose connecting part, 77: depth adjusting unit, 8: dust-transfer passage, 9: communication passage, 90: connection tube, A1: drive axis, A2: slide axis, A3: pivot axis, D1: distance, D2: distance

What is claimed is:

1. A dust collector configured to be mounted to a power tool, the power tool being configured to perform a processing operation on a workpiece by driving a tool accessory, the dust collector being configured to collect dust generated during the processing operation, the dust collector comprising:

a body having a mounting part, the mounting part being configured to be removably mounted to the power tool;

a dust-storing part mounted to the body and configured to store the dust;

a sliding part held by the body so as to be slidable in a specified axial direction, the sliding part having a suction part, the suction part having a suction port for the dust;

a dust-transfer passage connecting the suction port and the dust-storing part, at least a portion of the dust-transfer passage extending within the sliding part; and a biasing member biasing the sliding part in a first direction of the axial direction, the sliding part protruding from the body in the first direction, wherein:

the sliding part is configured to be normally held in an initial position in which the sliding part protrudes from the body by a specified length in the first direction, by a biasing force of the biasing member, and configured to be moved in a second direction opposite to the first direction in the axial direction against the biasing force when pressed in the second direction, and the dust collector includes a cushioning member configured to absorb impact applied to the body when the sliding part returns to the initial position, after the sliding part has been moved in the second direction from the initial position, by being interposed between the body and the sliding part in the axial direction when the sliding part is placed in the initial position.

2. The dust collector as defined in claim 1, wherein the cushioning member is mounted to the body.

3. The dust collector as defined in claim 2, wherein:

the sliding part has an adjusting member whose locking position with respect to the sliding part is changeable in the axial direction, the adjusting member being configured to adjust the specified length by which the sliding part protrudes from the body in the initial position, and the cushioning member is configured to be interposed between the body and the adjusting member in the axial direction when the sliding part is placed in the initial position.

4. The dust collector as defined in claim 1, wherein at least a portion of the sliding part is formed of metal having a lower specific gravity than iron.

5. The dust collector as defined in claim 1, further comprising:

a lock member held by the body so as to be pivotable around a specified pivot axis, wherein:

the lock member has a hook configured to be engaged with a recess of the power tool to thereby restrict a movement of the dust collector relative to the power tool when the mounting part is mounted to the power tool, and a distance between the pivot axis and a tip end of the hook is shorter than a distance between the pivot axis and a base end of the hook.

6. The dust collector as defined in claim 1, further comprising:

a lock member held by the body so as to be pivotable around a specified pivot axis, wherein:

the lock member has a hook configured to be engaged with a recess of the power tool to thereby restrict a movement of the dust collector relative to the power tool when the mounting part is mounted to the power tool, and the hook has a sliding-resistance part provided in an inside region of the hook and configured to restrict a sliding movement of the hook relative to the recess.

7. A power tool configured to perform a processing operation on a workpiece by driving a tool accessory, the power tool comprising:

a tool body; and the dust collector as defined in claim 1, the dust collector being removably mounted to the tool body via the mounting part.

8. The power tool as defined in claim 7, wherein:

the mounting part of the dust collector includes a guide rail or a guide groove extending in the axial direction, and the tool body has a guide groove configured to be slidingly engaged with the guide rail of the mounting part in the axial direction, or a guide rail configured to be slidingly engaged with the guide groove of the mounting part in the axial direction.

9. A dust collector configured to be mounted to a power tool, the power tool being configured to perform a processing operation on a workpiece by driving a tool accessory, the dust collector being configured to collect dust generated during the processing operation, the dust collector comprising:

a body having a mounting part, the mounting part being configured to be removably mounted to the power tool;

a dust-storing part mounted to the body and configured to store the dust;

a sliding part held by the body so as to be slidable in a specified axial direction, the sliding part having a suction part, the suction part having a suction port for the dust;

a dust-transfer passage connecting the suction port and the dust-storing part, at least a portion of the dust-transfer passage extending within the sliding part;

a biasing member biasing the sliding part in a first direction of the axial direction, the sliding part protruding from the body in the first direction, wherein:

the sliding part is configured to be normally held in an initial position in which the sliding part protrudes from the body by a specified length in the first direction, by a biasing force of the biasing member, and configured to be moved in a second direction opposite to the first direction in the axial direction against the biasing force when pressed in the second direction, and the dust collector includes a cushioning member configured to be interposed between the body and the sliding part in the axial direction when the sliding part is placed in the initial position; and an abutment member disposed adjacent to and on the second direction side of the cushioning member and configured to come into abutment with the sliding part when the sliding part is placed in the initial position.

10. The dust collector as defined in claim 9, wherein the abutment member is held to be slidable in the axial direction in a state in which a movement of the abutment member in the second direction is restricted.

11. A power tool configured to perform a processing operation on a workpiece by driving a tool accessory, the power tool comprising:

a tool body; and the dust collector as defined in claim 9, the dust collector being removably mounted to the tool body via the mounting part.

12. A dust collector configured to be mounted to a power tool, the power tool being configured to perform a processing operation on a workpiece by driving a tool accessory, the dust collector being configured to collect dust generated during the processing operation, the dust collector comprising:

a body having a mounting part, the mounting part being configured to be removably mounted to the power tool;

a dust-storing part mounted to the body and configured to store the dust;

a sliding part held by the body so as to be slidable in a specified axial direction, the sliding part having a suction part, the suction part having a suction port for the dust;

a dust-transfer passage connecting the suction port and the dust-storing part, at least a portion of the dust-transfer passage extending within the sliding part;

a biasing member biasing the sliding part in a first direction of the axial direction, the sliding part protruding from the body in the first direction, wherein:

the sliding part is configured to be normally held in an initial position in which the sliding part protrudes from the body by a specified length in the first direction, by a biasing force of the biasing member, and configured to be moved in a second direction opposite to the first direction in the axial direction against the biasing force when pressed in the second direction, the dust collector includes a cushioning member configured to be interposed between the body and the sliding part in the axial direction when the sliding part is placed in the initial position;

the body has a first stopper part, the sliding part has a second stopper part disposed to overlap with the first stopper part when viewed in the axial direction, and the cushioning member is interposed between the first stopper part and the second stopper part in the axial direction when the sliding part is placed in the initial position.

13. The dust collector as defined in claim 12, wherein the first stopper part, the cushioning member and the second stopper part are disposed on a same line extending in the axial direction.

14. The dust collector as defined in claim 12, wherein:

the body has a tubular part through which the sliding part is inserted and which holds the sliding part so as to be slidable in the axial direction, the first stopper part is provided on an inner peripheral portion of the tubular part, and the second stopper part is provided on an outer peripheral portion of the sliding part.

15. The dust collector as defined in claim 14, wherein the first stopper part and the second stopper part are configured as protruding parts which respectively protrude from an inner peripheral surface of the tubular part and an outer peripheral surface of the sliding part in a direction crossing a longitudinal axis of the sliding part.

16. A power tool configured to perform a processing operation on a workpiece by driving a tool accessory, the power tool comprising:
   a tool body; and
   the dust collector as defined in claim 12, the dust collector being removably mounted to the tool body via the mounting part.

\* \* \* \* \*